United States Patent
Kim et al.

(10) Patent No.: US 9,773,360 B2
(45) Date of Patent: *Sep. 26, 2017

(54) APPARATUS FOR PROCESSING A PLURALITY OF LOGGING POLICIES AND METHOD THEREOF

(71) Applicant: Hyundai Motor Company, Seoul (KR)

(72) Inventors: Chul Min Kim, Gyeonggi-do (KR); Myeong Gyu Jeong, Gyeonggi-do (KR); Dong Youl Lee, Gyeonggi-do (KR); Young Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,675

(22) Filed: May 2, 2015

(65) Prior Publication Data

US 2016/0171793 A1    Jun. 16, 2016

(30) Foreign Application Priority Data

Dec. 11, 2014  (KR) .......................... 10-2014-0178545

(51) Int. Cl.
*G07C 5/02*      (2006.01)
*G07C 5/08*      (2006.01)
(Continued)

(52) U.S. Cl.
CPC ....... *G07C 5/085* (2013.01); *G06F 17/30699* (2013.01); *G06F 17/30705* (2013.01); *G07C 5/008* (2013.01)

(58) Field of Classification Search
CPC ..... G07C 5/02; G07C 5/085; G06F 17/30699; G06F 17/30705
See application file for complete search history.

(56) References Cited

U.S. PATENT DOCUMENTS 6,721,888 B1 *   4/2004   Liu ..................... G06F 21/445
                                                    713/191
2008/0012725 A1 * 1/2008   Zoladek ................ G07C 5/008
                                                    340/870.07
(Continued)

FOREIGN PATENT DOCUMENTS

JP    2001-236014 A     8/2001
KR    10-0334128        3/2000
(Continued)

*Primary Examiner* — Redhwan k Mawari
*Assistant Examiner* — Anshul Sood
(74) *Attorney, Agent, or Firm* — Mintz Levin Cohn Ferris Glovsky and Popeo, P.C.; Peter F. Corless

(57) ABSTRACT

An apparatus for processing logging policies includes: a logging policy input section configured to receive a plurality of logging policies for use with vehicle data; a logging policy storage configured to store the received plurality of logging policies; a logging policy interpreter configured to extract profile data, variable data, and policy data from the plurality of logging policies stored at the logging policy storage; a logging policy analyzer configured to analyze the profile data, the variable data, and the policy data of the respective logging policies extracted by the logging policy interpreter and create an integration rule based on the analyzed data; an integration logging policy generator configured to generate an integration logging policy based on the integration rule created by the logging policy analyzer; and an integration logging policy processor configured to process the integration logging policy generated by the integration logging policy generator.

16 Claims, 5 Drawing Sheets

(51) Int. Cl.
    *G06F 17/30*     (2006.01)
    *G07C 5/00*     (2006.01)

(56) References Cited

U.S. PATENT DOCUMENTS

2014/0310359 A1    10/2014    Kim et al.
2016/0171801 A1*    6/2016    Kim .................... G07C 5/0841
                                                                                                                      701/1

FOREIGN PATENT DOCUMENTS

| KR | 10-0703887 | 6/2007 |
|---|---|---|
| KR | 10-2008-0047826 A | 5/2008 |
| KR | 10-2011-0044126 A | 4/2011 |
| KR | 10-2013-0096617 A | 8/2013 |
| KR | 10-1439018 B1 | 9/2014 |
| KR | 10-2014-0115901 A | 10/2014 |

* cited by examiner

APPARATUS FOR PROCESSING A PLURALITY OF LOGGING POLICIES AND METHOD THEREOF

CROSS-REFERENCE TO RELATED APPLICATION

This application claims the benefit of and priority to Korean Patent Application No. 10-2014-0178545, filed on Dec. 11, 2014 in the Korean Intellectual Property Office, the disclosure of which is incorporated herein in its entirety by reference.

TECHNICAL FIELD

The present disclosure relates generally to an apparatus for processing a plurality of logging policies and a method thereof, and more particularly, to techniques for processing a plurality of logging policies without having mutual collision in collecting vehicle data (e.g., sensor data, control data, network data, etc.).

BACKGROUND

Generally, techniques for collecting a variety of vehicle data (e.g., sensor data, control data, network data, etc.), which is generated in real-time during operation of the vehicle, are developed so as to enhance vehicle quality as well as various convenience services (e.g., public service, personalization service, etc.). The vehicle data typically includes various control and tuning data, and because the vehicle data is generated at temporal intervals as short as 10-100 ms, it can be beneficial to selectively collect the data depending on purpose of use, rather than collecting a full set of data.

Accordingly, it is desirable to selectively collect the vehicle data based on a logging policy which defines data collection specification (e.g., types of collected data, time of collecting data, cycle of collecting data, methods of collecting data, priority of collecting data, etc.) to selectively collect the vehicle data, depending on the given purpose of use. However, when a plurality of logging policies are applied to one single vehicle under a multi-user and/or multi-service environment, collisions may occur among the plurality of logging policies.

SUMMARY

The present disclosure has been made to solve the above-mentioned problems occurring in the related art while advantages achieved by the related art are maintained intact.

An aspect of the present disclosure provides an apparatus for processing a plurality of logging policies and a method thereof, which is capable of preventing collisions among the logging policies, by verifying integrity of the logging policies generated to collect vehicle data, integrating the verified logging policies into one single logging policy, and processing the same. Objects of the present disclosures are not limited to any specific examples mentioned above, but these and other objects and advantages of the present disclosures not specified herein can be understood based on the explanation provided below and will be more apparent based on the embodiments of the present disclosure. Further, it will be easily appreciated that the objects and advantages of the present disclosures can be achieved by the means of the claims and combinations thereof.

According to embodiments of the present disclosure, an apparatus for processing logging policies includes: a logging policy input section configured to receive a plurality of logging policies for use with vehicle data; a logging policy storage configured to store the plurality of logging policies received at the logging policy input section; a logging policy interpreter configured to extract profile data, variable data, and policy data from the plurality of logging policies stored at the logging policy storage; a logging policy analyzer configured to analyze the profile data, the variable data, and the policy data of the respective logging policies extracted by the logging policy interpreter and create an integration rule based on the analyzed data; an integration logging policy generator configured to generate an integration logging policy based on the integration rule created by the logging policy analyzer; and an integration logging policy processor configured to process the integration logging policy generated by the integration logging policy generator.

The logging policy analyzer may include: a profile analyzer configured to analyze the profile data of the respective logging policies extracted by the logging policy interpreter; a data analyzer configured to analyze the variable data and the policy data of the respective logging policies extracted by the logging policy interpreter; and an integration rule creator configured to create the integration rule based on the profile data analyzed by the profile analyzer and the variable data and the policy data analyzed by the data analyzer.

Each of the plurality of logging policies may include one or more policy files in a script format.

A logging policy of the plurality of logging policies may include the profile data, the variable data, which is used to determine a time of applying a policy, and the policy data, which is used to collect the vehicle data.

The profile data may include information relating to at least one of a vehicle model, a development stage, and a software version.

The variable data may include information relating to at least one of a priority, a time of application, a cycle of application, and a condition of transition.

The policy data may include information relating to at least one of a type and a characteristic of vehicle data to be collected, a type of a vehicle network, a topology, and a method of collecting vehicle data.

The logging policy input section may include: a memory configured to temporarily store the received plurality of logging policies; a filter configured to authorize the plurality of logging policies stored in the memory and conduct a first integrity check and a redundancy check; and an ID tagger configured to tag an ID to a logging policy of the plurality of logging policies that successfully passes the filter.

The logging policy interpreter may include: a parser configured to parse the plurality of logging policies stored at the logging policy storage; and a data extractor configured to extract the variable data and the policy data from the respective logging policies which are parsed by the parser.

The logging policy interpreter may further include: a contents checker configured to conduct a contents check to verify a result of the first integrity check conducted by the filter; and a grammar checker configured to conduct a grammar check to detect a structural error of policy files in a script format.

The logging policy interpreter may be further configured to conduct a second integrity check with respect to one or more logging policies that pass the first integrity check.

Furthermore, according to embodiments of the present disclosure, a method for processing logging policies includes: receiving, at a logging policy input section, a plurality of logging policies for use with vehicle data; storing, in a logging policy storage, the received plurality of logging policies; extracting, by a logging policy interpreter, profile data, variable data, and policy data from the plurality of logging policies; analyzing, by a logging policy analyzer, the extracted profile data, variable data, and policy data of the respective logging policies; creating, by the logging policy analyzer, an integration rule based on the analyzed data; generating, by an integration logging policy generator, an integration logging policy based on the created integration rule; and processing, by an integration logging policy processor, the generated integration logging policy.

The method may further include: analyzing, by a profile analyzer, the profile data of the respective logging policies extracted by the logging policy interpreter; analyzing, by a data analyzer, the variable data and the policy data of the respective logging policies extracted by the logging policy interpreter; and creating, by an integration rule creator, the integration rule based on the profile data analyzed by the profile analyzer and the variable data and the policy data analyzed by the data analyzer.

A logging policy of the plurality of logging policies may include one or more policy files in a script format, the profile data, the variable data, which is used to determine a time of applying the policy, and the policy data, which is used to collect the vehicle data.

The method may further include: temporarily storing, in a memory, the received plurality of logging policies; authorizing, by a filter, the plurality of logging policies stored in the memory; conducting, by the filter, a first integrity check and a redundancy check; and tagging, by an ID tagger, an ID to a logging policy of the plurality of logging policies that successfully passes the filter.

The method may further include: parsing, by a parser, the logging policies stored at the logging policy storage; and extracting, by a data extractor, the variable data and the policy data from the respective logging policies which are parsed by the parser.

The method may further include: conducting, by a contents checker, a contents check to verify a result of the first integrity check conducted by the filter; and conducting, by a grammar checker, a grammar check to detect a structural error of policy files in a script format.

The method may further include conducting, by the logging policy interpreter, a second integrity check with respect to one or more logging policies that pass the first integrity check.

Furthermore, according to embodiments of the present disclosure, a non-transitory computer readable medium containing program instructions for processing logging policies includes: program instructions that receive a plurality of logging policies for use with vehicle data; program instructions that store the received plurality of logging policies; program instructions that extract profile data, variable data, and policy data from the plurality of logging policies; program instructions that analyze the extracted profile data, variable data, and policy data of the respective logging policies; program instructions that create an integration rule based on the analyzed data; program instructions that generate an integration logging policy based on the created integration rule; and program instructions that process the generated integration logging policy.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
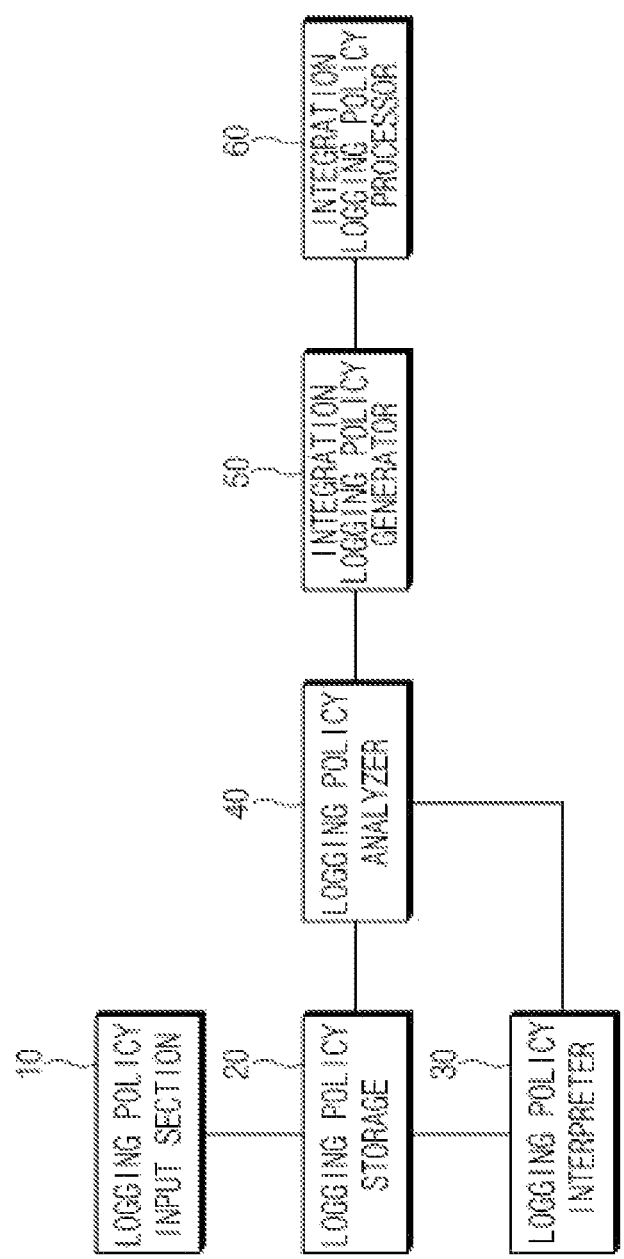
FIG. 1 is a block diagram of an apparatus for processing a plurality of logging policies according to embodiments of the present disclosure.

The above objects, characteristics and advantages will be made more apparent in view of the detailed description provided below with reference to the accompanying drawings, thus allowing those skilled in the art to easily embody the technical concept of the present disclosure. In the following description, well-known technologies are not described in detail since they would obscure the disclosure with unnecessary detail. Embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus for processing logging policies comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like.

Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a block diagram of an apparatus for processing a plurality of logging policies according to embodiments of the present disclosure.

Referring to FIG. 1, an apparatus for processing a plurality of logging policies according to embodiments of the present disclosure is mounted to the vehicles to process a plurality of logging policies applied to vehicles, and the apparatus includes a logging policy input section 10, a logging policy storage 20, a logging policy interpreter 30, a logging policy analyzer 40, an integration logging policy generator 50, and an integration logging policy processor 60.

To explain the respective components mentioned above in detail, first, the logging policy input section 10 receives an input of logging policies for use with vehicle data, which are generated from a server or a terminal, and runs a first integrity check on the inputted logging polices, and tags identifications (IDs) to the logging policies that passed the first integrity check. The logging policy input section 10 directly discards the logging policies that failed the first integrity check, without tagging these with IDs.

The logging policy, which is a policy file in a script format, includes profile data, variable data used to determine time of applying the policy, and policy data used to collect vehicle data. In this regard, the profile data can be read without parsing, and includes not only the information such as name of the policy, purpose of the policy, creator of the policy, date of creation, size of the policy, and the like, but also the information such as vehicle model that is subject to first integrity check, stage of development (e.g., fast, proto, pilot, master), as well as the software version. The variable data can be read with parsing and includes data such as priority, time of application (e.g., year/month/date/hour/minute/second), duration of application (e.g., 10 sec, 1 min, 10 min, etc.), cycle of application, condition of transition, and the like. The policy data can also be read with parsing and includes information such as type and characteristics of vehicle data to be collected, type of vehicle network, topology (e.g., number of CAN channels, database computer (DBC) file version, etc.), method of collecting vehicle data, and the like. The vehicle network includes a controller area network (CAN), local interconnect network (LIN), FlexRay, media oriented system transport (MOST), or the like.

Further, the logging policy input section 10 carries out three steps which will be explained below, when conducting the first integrity check on the inputted logging policies. In the first step, a determination is made as to whether the logging policy is generated normally from a previously authorized source. For example, the logging policy may be authorized by using accredited certificate of the logging policy or using security key to encrypt the logging policy itself.

In the second step, a determination is made as to the compatibility based on the vehicle model, the stage of development (e.g., fast, proto, pilot, master, etc.) and the software version of the profile data that cannot be read without parsing. That is, when the vehicle model, development stage, and software version of the target vehicle are identical to the vehicle model, development stage and software version of the inputted logging policies as a result of comparison, it is determined that the data has compatibility. As an example, when the target vehicle to be applied with the logging policy is a vehicle model named "GENESIS", but the inputted logging policy is for vehicle model named "EQUUS", it is determined that the data does not have compatibility. As another example, it is also determined that the data does not have compatibility, when the development stage of the target vehicle to be applied with the logging policy is "master", but the development stage of the inputted logging policy is "proto".

In the third step, a redundancy check is conducted based on the profile data which cannot be read without parsing to determine whether or not an identical logging policy file exists. That is, when determining that the identical logging policy exists, the inputted logging policy is discarded.

Next, the logging policy storage 20 stores the logging policies to which IDs are tagged by the logging policy input section 10. The logging policy storage 20 stores the logging policies in a variety of forms including file finder form, database form, or others.

Next, the logging policy interpreter 30 parses the logging policies stored at the logging policy storage 20 and conducts a second integrity check based on the result of parsing (e.g., with respect to one or more logging policies that pass the first integrity check). That is, for the second integrity check, the logging policy interpreter 30 performs grammar check to detect structural error in the script form of logging policy file, performs contents check to verify the result of the first integrity check, and extracts the profile data, variable data and policy data from the respective logging policies.

Next, the logging policy analyzer 40 analyzes the profile data, variable data and policy data of the respective logging policies which are extracted by the logging policy interpreter 30 and creates integration rule. That is, the logging policy analyzer 40 individually checks the inclusion relation among the data of the respective logging policies (i.e., variable data and policy data) extracted by the logging policy interpreter 30 and obtains a union thereof. For example, the integration logging policy generator 50 may be implemented as a script maker, and generates integration logging policy based on the integration rule that is created by the logging policy analyzer 40.

Next, the integration logging policy processor 60 collects vehicle data based on the integration logging policy generated by the integration logging policy generator 50.

Although embodiments of the present disclosure are explained with reference to an example in which the logging policy interpreter 30, the logging policy analyzer 40, the integration logging policy generator 50 and the integration logging policy processor 60 are implemented as individual configurations, these may be integrated into one single control module.

Figure 2:
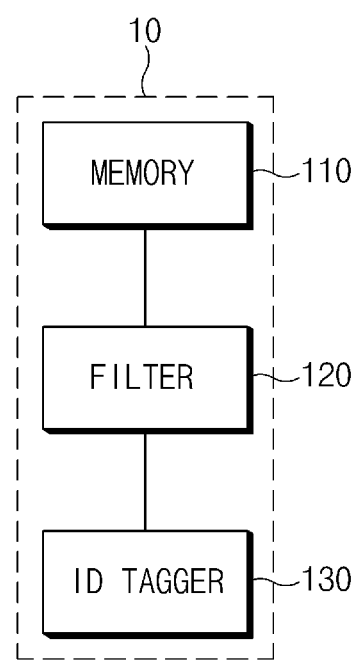
FIG. 2 is a block diagram of a logging policy input section according to embodiments of the present disclosure.

FIG. 2 is a block diagram of a logging policy input section according to embodiments of the present disclosure.

As illustrated in FIG. 2, the logging policy input section 10 includes a memory 110, a filter 120, and an ID tagger 130.

First, the memory 110 may desirably be implemented as a queue form, and temporarily stores the logging policy (policy file in a script format) as inputted from a terminal or a server.

The filter 120 authorizes the logging policy outputted from the memory 110, and conducts the first integrity check along with redundancy check.

The ID tagger 130 tags an ID to the logging policy which successfully passes the filter 120. That is, the ID tagger 130 tags the ID to the authorized logging policy which is proven to have first integrity and which is not redundant.

Figure 3:
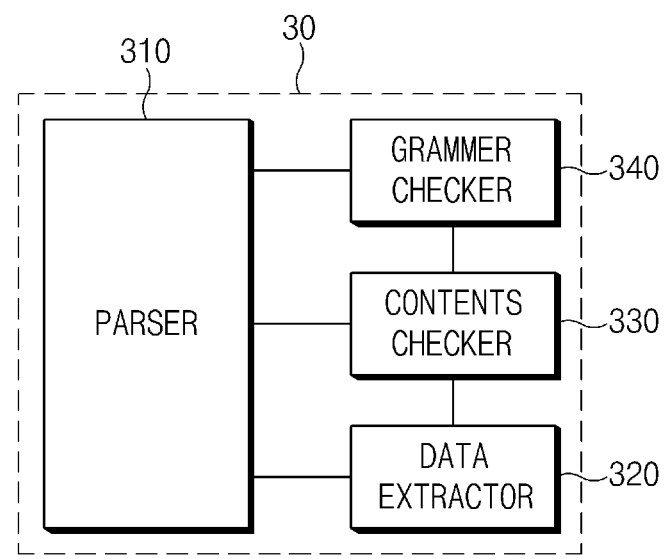
FIG. 3 is a block diagram of a logging policy interpreter according to embodiments of the present disclosure.

FIG. 3 is a block diagram of a logging policy interpreter according to embodiments of the present disclosure.

As illustrated in FIG. 3, the logging policy interpreter 30 includes a parser 310, a data extractor 320, a contents checker 330 and a grammar checker 340.

First, the parser 310 parses the logging policies stored at the logging policy storage 20.

The data extractor 320 extracts the variable data and profile data from the logging policy parsed by the parser 310. Further, the data extractor 320 extracts the profile data from the logging policy stored at the logging policy storage 20.

The contents checker 330 conducts contents check to verify the result of the first integrity check conducted by the logging policy input section 10.

The grammar checker 340 performs grammar check to detect a structural error of the logging policy file in a script format.

Figure 4:
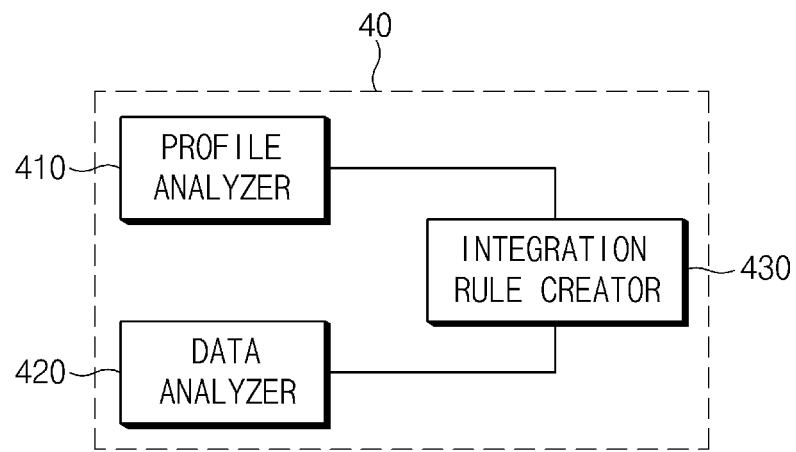
FIG. 4 is a block diagram of a logging policy analyzer according to embodiments of the present disclosure.

FIG. 4 is a block diagram of a logging policy analyzer according to embodiments of the present disclosure.

As illustrated in FIG. 4, the logging policy analyzer 40 includes a profile analyzer 410, a data analyzer 420 and an integration rule creator 430.

First, the profile analyzer 410 analyzes the profile data of the respective logging policies extracted by the data extractor 320. The profile data in this case includes not only the data such as name of the policy, objectives of the policy, creator of the policy, date of creation, size of the policy, and the like, but also the data such as vehicle model, development stage (e.g., fast, proto, pilot, master), as well as the software version of the vehicle subjected to the first integrity check.

Next, the data analyzer 420 analyzes the variable data and the policy data of the respective logging policies extracted by the data extractor 320. The variable data includes data such as priority, time of application (e.g., year/month/date/hour/minute/second), duration of application (e.g., 10 sec, 1 min, 10 min, etc.), cycle of application, condition of transition, and the like, while the policy data includes information such as type and characteristics of vehicle data to collect, type of vehicle network, topology, number of CAN channels, database computer (DBC) file version, and the like, as well as methods for collecting vehicle data or the like.

Next, the integration rule creator 430 creates integration rules based on the profile data analyzed by the profile analyzer 410, and the variable data and the policy data analyzed by the data analyzer 420. That is, the integration rule creator 430 individually checks the inclusion relations among the data (i.e., variable data and policy data) of the respective logging policies analyzed by the data analyzer 420 and obtains a union thereof. The integration rule creator 430 may create integration rule, by additionally using the profile data analyzed by the profile analyzer 410.

Figure 5:
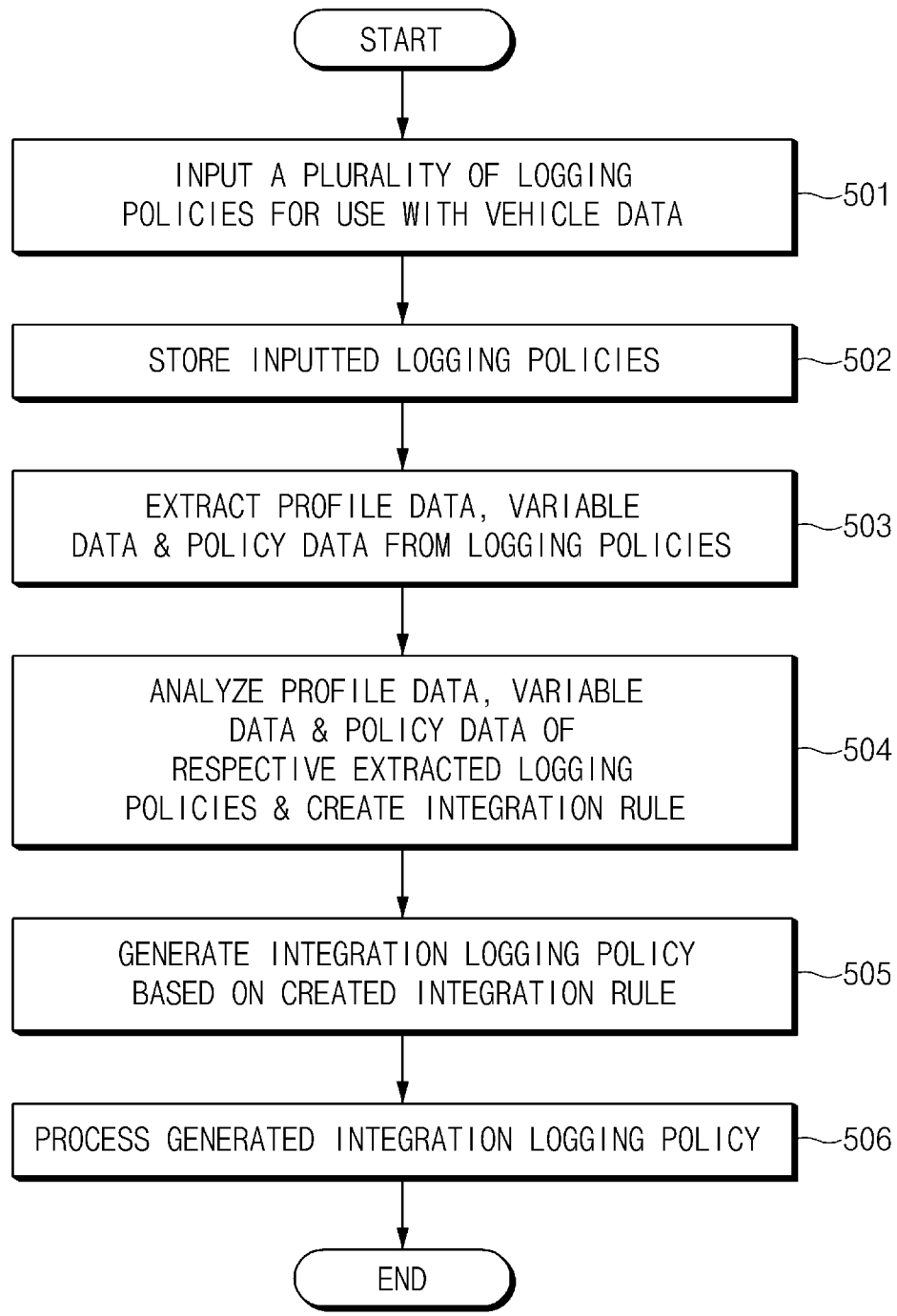
FIG. 5 is a flowchart illustrating a method for processing a plurality of logging policies according to embodiments of the present disclosure.

FIG. 5 is a flowchart illustrating a method for processing a plurality of logging policies according to embodiments of the present disclosure.

First, at step 501, the logging policy input section 10 receives a plurality of logging policies for use with vehicle data, from a terminal or a server.

Next, at step 502, the logging policy storage 20 stores the logging policies inputted by the logging policy input section 10.

Next, at step 503, the logging policy interpreter 30 extracts the profile data the variable data and the policy data from the logging policies stored at the logging policy storage 10.

After that, at step 504, the logging policy analyzer 40 analyzes the profile data, variable data and policy data of the respective logging policies extracted by the logging policy interpreter 30, and then creates integration rule.

Next, at step 505, the logging policy generator 50 generates an integration logging policy based on the integration rule created by the logging policy analyzer 40.

After that, at step 506, the logging policy processor 60 processes the integration logging policy created by the integration logging policy creator 50.

The embodiments of the present disclosure described above are desirably applied when there is common data among the vehicle data that is collected by the respective logging policies, i.e., when there is common vehicle data among the vehicle data collected by the plurality of logging policies. As described above, according to the embodiments of the present disclosure, collisions among a plurality of logging policies generated to collect vehicle data are prevented, by verifying integrity of the logging policies, integrating the verified logging policies into one single logging policy, and processing the same.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for processing logging policies which define data collection specifications for selectively collecting vehicle data in a vehicle, the apparatus comprising:
    a memory configured to store program instructions; and
    a processor configured to execute the program instructions, which when executed cause the processor to:
        receive a plurality of logging policies which define data collection specifications for selectively collecting vehicle data;
        store the plurality of received logging policies;
        extract profile data, variable data, and policy data from the plurality of stored logging policies;
        determine data included in each of the extracted profile data, the extracted variable data, and the extracted policy data of each of the respective plurality of logging policies;
        generate an integrated logging policy based on the data determined to be included in each of the extracted profile data, the extracted variable data, and the extracted policy data; and
        selectively collect vehicle data among a plurality of available vehicle data by processing the generated integrated logging policy
    wherein one or more sensors equipped in the vehicle generate vehicle data in accordance with a collection specification defined by the integrated logging policy.

2. The apparatus according to claim 1, wherein each of the plurality of logging policies includes one or more policy files in a script format.

3. The apparatus according to claim 2, wherein a logging policy of the plurality of logging policies includes the profile data, the variable data, which is used to determine a time of applying a policy, and the policy data, which is used to collect the vehicle data.

4. The apparatus according to claim 3, wherein the profile data includes information relating to at least one of a vehicle model, a development stage, and a software version.

5. The apparatus according to claim 3, wherein the variable data includes information relating to at least one of a priority, a time of application, a cycle of application, and a condition of transition.

6. The apparatus according to claim 3, wherein the policy data includes information relating to at least one of a type and a characteristic of vehicle data to be collected, a type of a vehicle network, a topology, and a method of collecting vehicle data.

7. The apparatus according to claim 1, wherein the processor is further caused to:
temporarily store the received plurality of logging policies;
authorize the plurality of stored logging policies;
conduct a first integrity check and a redundancy check on the plurality of logging policies to determine whether a logging policy is valid; and
tag an ID to a valid logging policy of the plurality of logging policies according to the conducted first integrity check and redundancy check.

8. The apparatus according to claim 7, wherein the processor is further caused to:
conduct a contents check to verify a result of the first integrity check; and
conduct a grammar check to detect a structural error of policy files in a script format.

9. The apparatus according to claim 7, wherein the processor is further caused to conduct a second integrity check with respect to one or more logging policies that pass the first integrity check.

10. The apparatus according to claim 1, wherein the processor is further caused to:
parse the plurality of stored logging policies; and
extract the variable data and the policy data from the parsed logging policies.

11. A method for processing logging policies which define data collection specifications for selectively collecting vehicle data in a vehicle, wherein a memory is configured to store program instructions for performing the method, and a processor is configured to execute the stored program instructions, the method comprising:
receiving, by the processor, a plurality of logging policies which define data collection specifications for selectively collecting vehicle data;
storing, by the processor, the received plurality of logging policies;
extracting, by the processor, profile data, variable data, and policy data from the plurality of logging policies;
determining, by the processor, data included in each of the extracted profile data, the extracted variable data, and the extracted policy data of each of the respective plurality of logging policies;
generating, by the processor, an integrated logging policy based on the data determined to be included in each of the extracted profile data, the extracted variable data, and the extracted policy data; and
selectively collecting, by the processor, vehicle data among a plurality of available vehicle data by processing the generated integrated logging policy,
wherein one or more sensors equipped in the vehicle generate vehicle data in accordance with a collection specification defined by the integrated logging policy.

12. The method according to claim 11, wherein a logging policy of the plurality of logging policies includes one or more policy files in a script format, the profile data, the variable data, which is used to determine a time of applying the policy, and the policy data, which is used to collect the vehicle data.

13. The method according to claim 11, further comprising:
temporarily storing, by the processor, the received plurality of logging policies;
authorizing, by the processor, the plurality of stored logging policies;
conducting, by the processor, a first integrity check and a redundancy check on the plurality of logging policies to determine whether a logging policy is valid; and
tagging, by the processor, an ID to a valid logging policy of the plurality of logging policies according to the conducted first integrity check and redundancy check.

14. The method according to claim 13, further comprising:
conducting, by the processor, a contents check to verify a result of the first integrity check; and
conducting, by the processor, a grammar check to detect a structural error of policy files in a script format.

15. The method according to claim 14, further comprising conducting, by the processor, a second integrity check with respect to one or more logging policies that pass the first integrity check.

16. The method according to claim 11, further comprising:
parsing, by the processor, the stored logging policies; and
extracting, by the processor, the variable data and the policy data from the parsed logging policies.

* * * * *